United States Patent
Ashwood-Smith

(10) Patent No.: US 10,063,464 B2
(45) Date of Patent: Aug. 28, 2018

(54) PROTECTION SWITCHED SOURCE ROUTING

(71) Applicant: Futurewei Technologies, Inc., Plano, TX (US)

(72) Inventor: Peter Ashwood-Smith, Gatineau (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 142 days.

(21) Appl. No.: 14/339,036

(22) Filed: Jul. 23, 2014

(65) Prior Publication Data

US 2015/0029837 A1 Jan. 29, 2015

Related U.S. Application Data

(60) Provisional application No. 61/858,858, filed on Jul. 26, 2013.

(51) Int. Cl.
*H04L 12/721* (2013.01)
*H04L 12/26* (2006.01)
*H04L 12/707* (2013.01)

(52) U.S. Cl.
CPC .......... *H04L 45/34* (2013.01); *H04L 43/0811* (2013.01); *H04L 43/10* (2013.01); *H04L 45/22* (2013.01); *H04L 45/70* (2013.01)

(58) Field of Classification Search
CPC . H04L 12/2678; H04L 12/2686; H04L 43/10; H04L 43/12
See application file for complete search history.

(56) References Cited

U.S. PATENT DOCUMENTS

| 8,081,566 B1 | 12/2011 | Ashwood-Smith et al. |
| 2004/0156310 A1* | 8/2004 | Fredette ................. H04L 45/00 370/216 |

(Continued)

FOREIGN PATENT DOCUMENTS

WO  2011116460 A1  9/2011

OTHER PUBLICATIONS

Mohamed Aissani, Abdelhamid Mellouk, Walid Demigha and Mustapha Reda Senouci, Link failure resilience in the dynamic source routing protocol, Wirel. Commun. Mob. Comput, Mar. 5, 2008, pp. 1-15.*

(Continued)

*Primary Examiner* — Christopher Crutchfield
(74) *Attorney, Agent, or Firm* — Conley Rose, P.C.

(57) ABSTRACT

A network element configured to operate in a source routing network, wherein the network element comprises a receiver, a transmitter, and a processor coupled to the receiver and the transmitter. The processor may be configured to cause the network element to receive from an upstream network element, a liveness protection probe comprising a header that comprises a list of one or more ordered connection identifiers that indicate a network path traversing the source routing network through which the liveness protection probe should be forwarded, transmit the liveness protection probe toward a downstream network element according to the connection identifiers, receive the liveness protection probe from the downstream network element, and transmit the liveness protection probe to the upstream network element according to a second list of one or more ordered connection identifiers contained within the header.

18 Claims, 4 Drawing Sheets

(56) References Cited

U.S. PATENT DOCUMENTS

| | | | |
|---|---|---|---|
| 2006/0168192 A1* | 7/2006 | Sharma | G06F 11/2028 709/224 |
| 2007/0064618 A1* | 3/2007 | Garcia | H04L 43/12 370/252 |
| 2007/0070909 A1 | 3/2007 | Reeve | |
| 2008/0095163 A1* | 4/2008 | Chen | H04L 45/16 370/392 |
| 2008/0219264 A1 | 9/2008 | Wijnands et al. | |
| 2009/0006697 A1* | 1/2009 | Doherty | H04L 45/00 710/300 |
| 2009/0190478 A1* | 7/2009 | Li | H04L 45/02 370/238 |
| 2009/0190481 A1 | 7/2009 | Kobayashi et al. | |
| 2010/0118711 A1* | 5/2010 | Cankaya | H04L 41/5016 370/248 |
| 2010/0180048 A1 | 7/2010 | Guo et al. | |
| 2011/0058472 A1* | 3/2011 | Owens | H04L 45/00 370/228 |
| 2012/0147752 A1 | 6/2012 | Ashwood-Smith et al. | |
| 2014/0112148 A1* | 4/2014 | Flinta | H04L 43/087 370/235.1 |
| 2014/0177638 A1* | 6/2014 | Bragg | H04L 45/50 370/395.5 |

OTHER PUBLICATIONS

C. Sunshine, Source Routing in Computer Networks, ACM SIGCOMM, Jan. 1977, pp. 29-33.*
S. Kim, J. Park, E. Paik, SPRING Use Cases for Software-defined Networking, Nov. 5, 2013, pp. 1-6.*
Foreign Communication From a Counterpart Application, PCT Application No. PCT/CN2014/083154, International Search Report dated Nov. 19, 2014, 7 pages.
Foreign Communication From a Counterpart Application, PCT Application No. PCT/CN2014/083154, Written Opinion dated Nov. 6, 2014, 7 pages.
Weingarten, Ed., et al., "MPLS Transport Profile (MPLS-TP) Linear Protection," RFC 6378, Oct. 2011, 45 pages.
Ashwood-Smith, et al., "SDN State Reduction," draft-ashwood-sdnrg-state-reduction-00.txt, Jul. 3, 2013, 23 pages.
Stevens, et al., "TCP/IP Illustrated, vol. 1 The Protocols," Traceroute Program, XP002144685, Jan. 1994, 14 pages.
Foreign Communication From a Counterpart Application, European Application No. 14828846.7, Partial Supplementary European Search Report dated Jun. 27, 2016, 9 pages.
Foreign Communication From a Counterpart Application, European Application No. 14828846.7, Extended European Search Report dated Oct. 27, 2016, 18 pages.

* cited by examiner

US 10,063,464 B2

PROTECTION SWITCHED SOURCE ROUTING

CROSS-REFERENCE TO RELATED APPLICATIONS

The present application claims priority to U.S. Provisional Patent Application 61/858,858, filed on Jul. 26, 2013 by Peter Ashwood-Smith, and entitled "Protection Switched Source Routing," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Source routing is a protocol that partially or completely specifies, within a source route header, a route that a packet may travel via a network. The source route header may contain a strict list or a loose list of links and/or nodes to traverse. The strict list may explicitly list all of the links and/or nodes a packet may be transported over. Alternatively, the loose list may specify one or more links and/or nodes that the packet may need to traverse through to reach a destination, and may not include all the links and/or nodes that a packet may traverse through to reach the destination. As such, additional routing decisions may be used to route the packet through one intermediate point and to another intermediate point. Implementing source routing may simplify data forwarding network nodes and reduce routing time and latency when compared to using a forwarding table. Instead of performing lookup functions using the forwarding table, a network node (e.g. router or switch) may use the routing information within the source route header to forward the data packet.

SUMMARY

In one embodiment, the disclosure includes a network element configured to operate in a source routing network, wherein the network element comprises a receiver, a transmitter, and a processor coupled to the receiver and the transmitter. The processor may be configured to cause the network element to receive from an upstream network element, a liveness protection probe comprising a header that comprises a list of one or more ordered connection identifiers that indicate a network path traversing the source routing network through which the liveness protection probe should be forwarded, transmit the liveness protection probe toward a downstream network element according to the connection identifiers, receive the liveness protection probe from the downstream network element, and transmit the liveness protection probe to the upstream network element according to a second list of one or more ordered connection identifiers contained within the header.

In another embodiment, the disclosure includes a method for performing protection switching in a source routing network, implemented in a network element, wherein the method comprises receiving via a tandem network element in the source routing network, a data packet transmitted through a network path from an ingress node, receiving from the ingress node, via the network path of the data packet, a source routing network failure detection probe comprising a header and a payload, and transmitting the failure detection probe toward the ingress node through the source routing network in response to receiving the failure detection probe from the ingress node.

In yet another embodiment, the disclosure includes an ingress node in a source routing network comprising a receiver, a transmitter, and a processor coupled to the receiver and the transmitter. The processor may be configured to cause the ingress node to receive a data packet from a source, receive a plurality of source routing encapsulation identifiers that indicate a plurality of paths across the source routing network for transmitting the data packet to an egress node, and transmit to the egress node, a source routing network path protection probe along a primary network path indicated by a first set of encapsulation identifiers. The processor may also be configured to encapsulate the data packet with the first set of encapsulation identifiers when the protection probe is received from the egress node, encapsulate the data packet with a second set of encapsulation identifiers that indicate a backup network path over which the data packet should be forwarded when the protection probe is not received from the egress node within a predetermined duration, and transmit the data packet to a downstream node according to the encapsulation identifiers.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Protection switching is a means by which a network may be safeguarded against failures. In protection switched networks such as wavelength-division multiplexing (WDM), time-division multiplexing (TDM), asynchronous transfer mode (ATM), and multi-protocol label switching (MPLS), a backup path from a source to a destination may be used to bypass failures in the network. When a node detects a failure in a protection switched network, a node may activate a protection mechanism in the network causing nodes to detour or reroute data traffic that would be affected by the failure. Nodes that make these decisions for forwarding the data traffic are known as tandem nodes (e.g. interior nodes in a network that are neither an ingress node nor an egress node) that have stateful connections. Stateful connections are connections in which a device keeps track of the logical network location of other devices and/or tracks a connection and/or flow temporarily and/or over an extended period of time. The tandem nodes may therefore maintain knowledge and/or state of connections (e.g. primary connections and/or backup connections) that traverse the tandem nodes.

Disclosed herein is a protection scheme for providing protection switching in a source routing network that does not support maintaining per connection routing states on tandem nodes. The disclosed scheme may enable a source routing network operating with stateless connections to determine liveness or connectivity status of a network path by transmitting a probe from an ingress node to an egress node, and reflecting the probe back toward the ingress node from the egress node upon receipt. The disclosed scheme may facilitate switching a data flow from a primary network path to a backup network path when the primary network path is degraded or not operating, as well as switching the data flow from the backup network path to the primary network path when the primary network path has operated normally over a defined number of probes.

Figure 1:
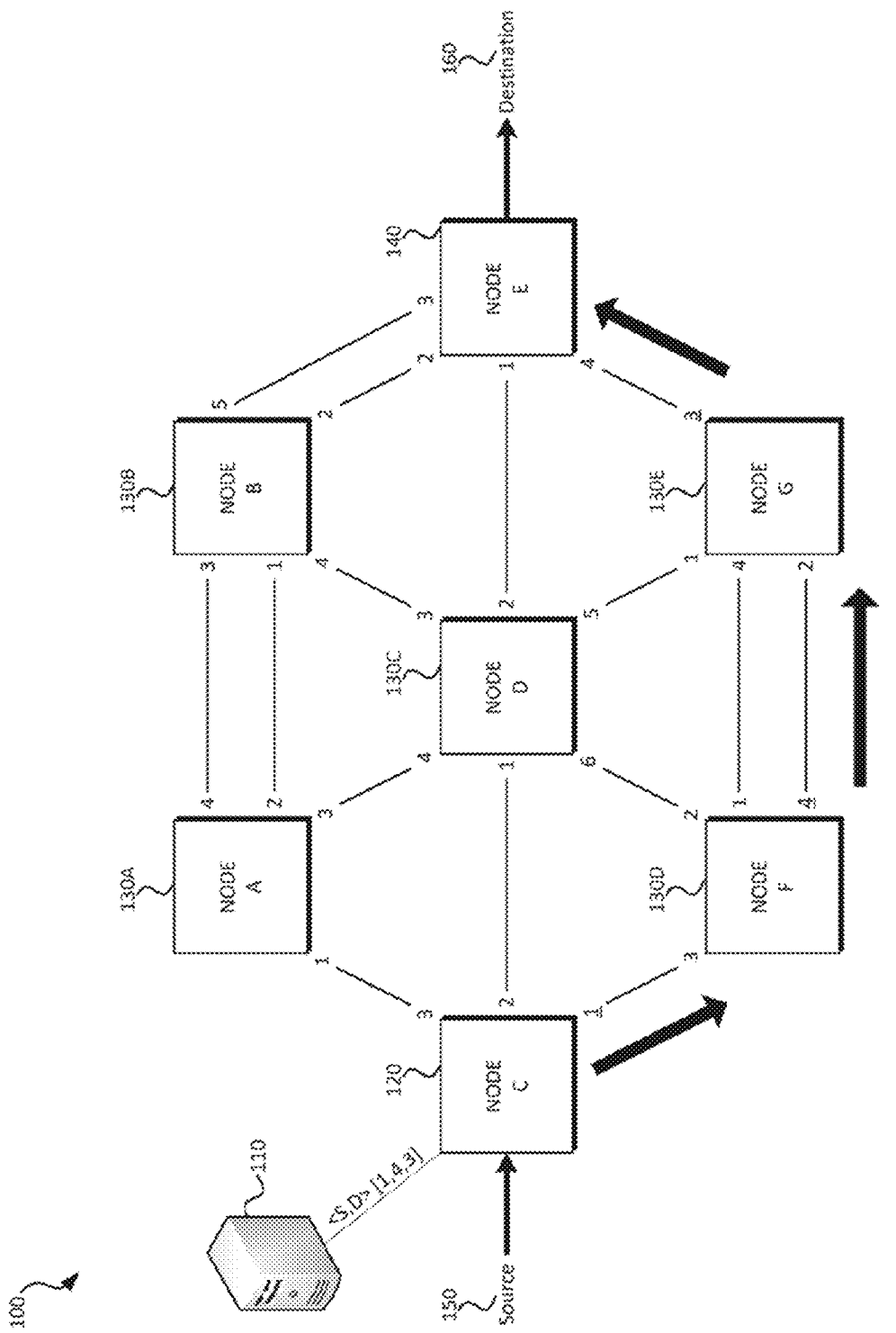
FIG. 1 is a schematic diagram of an embodiment of a source routing network.

FIG. 1 is a schematic diagram of an embodiment of a source routing network 100 in which embodiments of the present disclosure may operate. Network 100 may include a plurality of interconnected elements capable of facilitating the transmission of data from a source to a destination, such as a controller 110, an ingress node 120, tandem nodes 130 (e.g. a node in a network path that is neither an ingress node nor an egress node), an egress node 140, a source 150, and a destination 160. In network 100, a controller 110 may maintain awareness of the topology and status of network 100. For example, the controller 110 may know the location of all nodes within network 100, as well as connections/links between the nodes, such that the controller 110 may be capable of determining a route from ingress node 120 to an egress node 140 via one or more tandem nodes 130 to support connectivity between source 150 and destination 160. Connections between the nodes may be identified by each node locally assigning an identifier to each link connecting to that node, including each branch of parallel links between nodes. The controller 110 may explicitly specify some or all connections over which a data packet traversing network 100 should be transmitted. A listing of connections may be a list of links that identify links between nodes, a list of nodal identifiers that list particular nodes (e.g. ingress node 120, tandem nodes 130, and egress node 140) in network 100, or combinations thereof. Links and/or nodes may be globally and/or locally assigned. When the listing of connections is a list of nodal identifiers, the list may be a partial or "loose" list.

Controller 110 may be any network controller, either central or distributed, that is capable of maintaining awareness of the topology of source routed network 100 and determining a route through the source routed network from source 150 to destination 160 for data. For example, controller 110 may be OpenFlow enabled. An OpenFlow enabled controller may enable transmission of data in a network by transmitting a plurality of flow tables to one or more nodes in the network for routing the data from a source to a destination via the nodes. Controller 110 may calculate a plurality of routes (e.g. a primary route and one or more backup routes) from source 150 to destination 160 through the network for a data packet and/or data flow according to a set of routing rules. The plurality of routes calculated by controller 110 may be calculated in such a way as to be disjoint/maximally diverse. In other words, controller 110 may calculate the routes such that a primary route and a backup route may have minimal or no links/nodes in common, thereby providing the backup routes the best chance of successful routing through network 100 if the primary route fails. After calculating the plurality of routes, controller 110 may then transmit the plurality of routes to ingress node 120.

Ingress node 120 may receive the plurality of routes from controller 110 and store the routes in a table. The table may be known as a flow table, a routing table, a forwarding information base, or any other name known to one of ordinary skill in the art. After receiving a data packet from source 150, ingress node 120 may encapsulate the data packet with a header that includes the route received from controller 110 and, in some embodiments, a pointer or indicator that may indicate the next hop over which the data packet should be transmitted. The route that is included in the header may be chosen according to predefined rules for choosing routes in network 100. For example, a primary route may be encapsulated onto the data packet when network 100 is operating normally. If network 100 is not operating normally, a backup route may be encapsulated onto the data packet. After encapsulating the data packet with the route, ingress node 120 may advance the pointer that indicates a next hop in the header and then forward the data packet to a tandem node 130 according to the next hop identified in the route contained in the header. In some embodiments, rather than advancing a pointer, after encapsulating the data packet with the route, ingress node 120 may perform a pop operation that exposes a next hop in the header and then forward the data packet to a tandem node 130 according to the next hop identified in the route contained in the header.

Tandem nodes 130 may receive and forward data packets in network 100 via stateless connections. In other words, each tandem node 130 may receive a data packet from an upstream node and forward the data packet to a downstream node according to the route information contained in the header that is encapsulated on the data packet without referencing a connection specific table. For example, a tandem node 130 may receive a data packet with a header containing a list of links to follow. The tandem node 130 may read the list of links, extract the next link according to the pointer, advance the pointer, and transmit the data packet to the downstream node indicated by the extracted link. In some embodiments of network 100, tandem nodes 130 may be configured to reverse the route contained in the header of the data packet on a hop by hop basis, replacing the connection identifier used to reach the tandem node 130 from an upstream node with a connection identifier to return to the upstream node from the tandem node 130. In some embodiments that do not have an explicit pointer, the list of links and/or nodes may be advanced by popping and/or removing the previous link/node identifier used to reach the current node from the list before forwarding. For example, in FIG. 1, a tandem node 130 (shown as node F) may receive a data packet with a header containing a list of links [1, 4, 3], where the pointer is noted by underscoring the next hop. In this example, node F may receive the data packet from node C over link 1. After receipt of the data packet, but prior to transmitting the data packet to node G, node F may replace link 1 with a link identifier that may be taken to return to node C, in this example, link 3. Therefore, node F would receive from node C a header containing [1, 4, 3] and may transmit a header containing [3, 4, 3] to node G.

Egress node 140 may receive the data packet from a tandem node 130 in network 100. In some embodiments, after the data packet is received, egress node 140 may remove the header that contains the routes that were used to forward the data packet through network 100 prior to transmitting the data packet to its destination. In some other embodiments, egress node 140 may transmit data packets back through network 100 according to routing information contained in the header of the data packet by reverse routing. In yet other embodiments, egress node 140 may reverse route the data packets back through the network 100 according to information contained in the payload of the data packet. In yet other embodiments, egress node 140 may be explicitly programmed by controller 110 with the reverse route to use through network 100.

It should be noted the ingress node 120, tandem nodes 130, and egress node 140 may operate as a network domain. Source 150 and destination 160 may operate in other network domains. Accordingly, ingress node 120 and egress node 140 may act as edge nodes for a source routing domain. In some embodiments, some or all of tandem nodes 130 may act as edge nodes for other domains. Accordingly, tandem nodes 130 may each act as ingress nodes 120 and/or egress nodes 140 for additional connections across the source routing domain. It should also be noted that the terms upstream, downstream, ingress, and egress are employed herein to indicate packet direction for clarity of discussion and should not be considered limiting.

Figure 2:
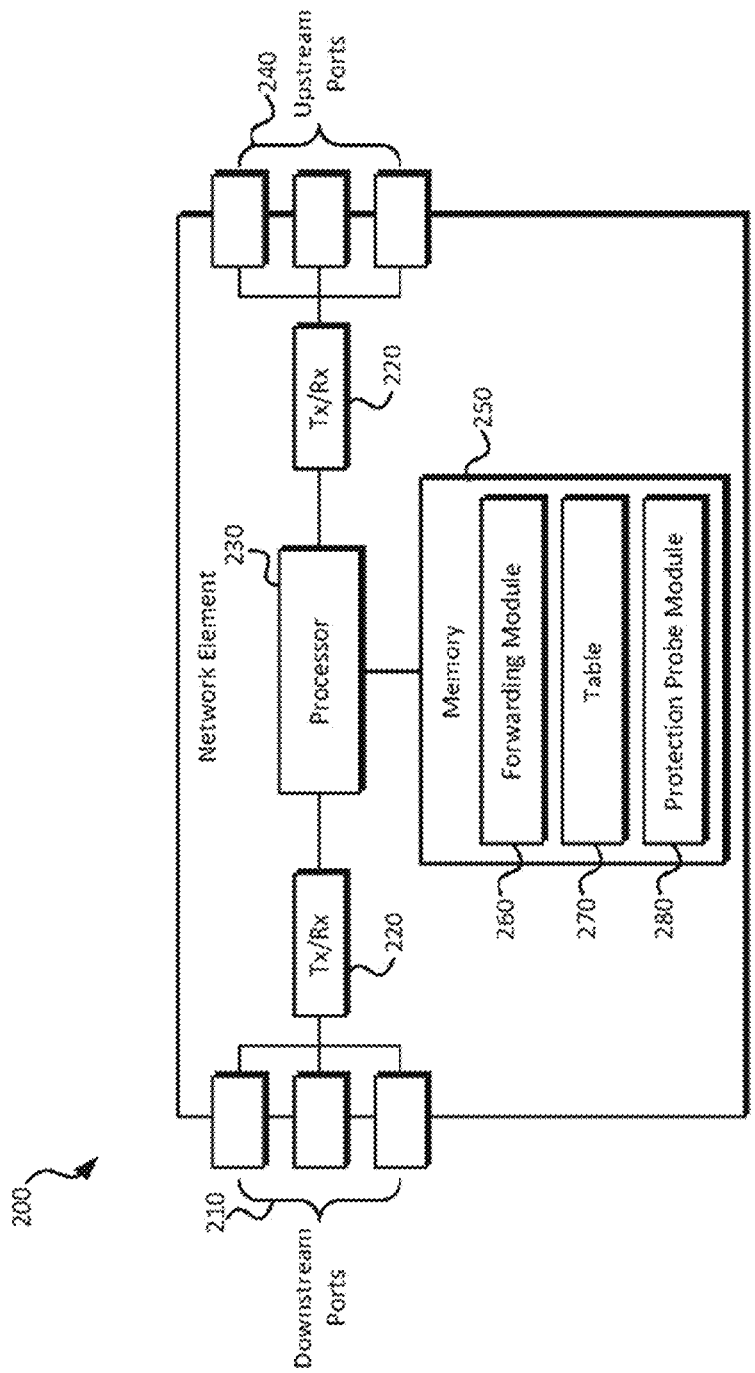
FIG. 2 is a schematic diagram of an embodiment of a network element in a source routing network.

At least some of the features/methods described in this disclosure may be implemented in a network element (NE) 200. For instance, the features/methods of this disclosure may be implemented using hardware, firmware, and/or software installed to run on hardware. The network element may be any device that transports data through a network, e.g., a switch, router, bridge, server, client, etc. FIG. 2 is a schematic diagram of an embodiment of a network element 200 that may be used to transport and/or process traffic through at least a portion of a source routing network 100, shown in FIG. 1. The network element 200 may be any device (e.g., an access point, an access point station, a router, a switch, a gateway, a bridge, a server, a client, a user-equipment, a mobile communications device, etc.) which transports data through a network, system, and/or domain. Moreover, the terms network "element," network "node," network "component," network "module," and/or similar terms may be interchangeably used to generally describe a network device and do not have a particular or special meaning unless otherwise specifically stated and/or claimed within the disclosure. In one embodiment, the network element 200 may be an apparatus configured to implement dynamic multi-route addressing and/or to establish and communicate data traffic via a radio based connection (e.g., wirelessly). For example, network element 200 may be incorporated in any of controller 110, ingress node 120, tandem nodes 130, and/or egress node 140, shown in FIG. 1.

The network element 200 may comprise one or more downstream ports 210 coupled to a transceiver (Tx/Rx) 220, which may be transmitters, receivers, or combinations thereof. The Tx/Rx 220 may transmit and/or receive frames from other network nodes via the downstream ports 210. Similarly, the network element 200 may comprise another Tx/Rx 220 coupled to a plurality of upstream ports 240, wherein the Tx/Rx 220 may transmit and/or receive frames from other nodes via the upstream ports 240. The downstream ports 210 and/or the upstream ports 240 may include electrical and/or optical transmitting and/or receiving components. In another embodiment, the network element 200 may comprise one or more antennas coupled to the Tx/Rx 220. The Tx/Rx 220 may transmit and/or receive data (e.g., packets) from other network elements wirelessly via one or more antennas.

A processor 230 may be coupled to the Tx/Rx 220 and may be configured to process the frames and/or determine to which nodes to send (e.g., transmit) the packets. In an embodiment, the processor 230 may comprise one or more multi-core processors and/or memory modules 250, which may function as data stores, buffers, etc. The processor 230 may be implemented as a general processor or may be part of one or more application specific integrated circuits (ASICs), field-programmable gate arrays (FPGAs), and/or digital signal processors (DSPs). Although illustrated as a single processor, the processor 230 is not so limited and may comprise multiple processors. The processor 230 may be configured to communicate and/or process multi-destination frames.

FIG. 2 also illustrates that a memory module 250 may be coupled to the processor 230 and may be a non-transitory medium configured to store various types of data. Memory module 250 may comprise memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage may be used to store programs which are loaded into the RAM when such programs are selected for execution. The ROM is used to store instructions and perhaps data that are read during program execution. The ROM is a non-volatile memory device which typically has a small memory capacity relative to the larger memory capacity of the secondary storage. The RAM is used to store volatile data and perhaps to store instructions. Access to both the ROM and RAM is typically faster than to the secondary storage.

The memory module 250 may be used to house the instructions for carrying out the various embodiments described herein. In one embodiment, memory module 250 may comprise a forwarding module 260 which may be implemented on processor 230 and configured to forward data packets according to connection identifiers. In one embodiment, forwarding module 260 may be implemented to facilitate content forwarding and processing functions in a source routing network, such as network 100, shown in FIG. 1. In some embodiments, network element 200 (e.g. when being used as an ingress node 120, shown in FIG. 1) may maintain connection information in a table 270 at memory module 250. The table 270 may be used by to encapsulate a data packet for which network element 200 serves as an ingress node to the network with a series of connection identifiers for traversing the network prior to being forwarded by forwarding module 260. Forwarding module 260 may forward data packets received by network element 200 by receiving the data packet from processor 230, reading a set of connection identifiers included in the data packets, extracting a next link/hop from the connection identifiers, and forwarding the data packet back to processor 230. In some embodiments, forwarding module 230 may determine whether to send the data packets on a primary network path or a backup network path according to protection probe module 280 and methods of this disclosure. Forwarding module 260 may be implemented using software, hardware, or both and may operate above the Internet Protocol (IP) layer, e.g., linking layer 2 (L2) or linking layer 3 (L3), in the Open Systems Interconnect (OSI) model. In some embodiments, memory module 250 may further comprise a protection probe module 280 which may be implemented on processor 230 and configured to perform the protection switching scheme discussed below in greater detail. Protection probe module 280 may provide failure protection for the network by probing the network to determine when a network path is not operating normally, causing network element 200 to encapsulate the data packet with a different series of connection identifiers, determining when a network path that is not operating normally returns to normal operation, and/or reflecting a probe received from a network element back toward the network element. In some embodiments, forwarding module 260, table 270 and protection probe module 280 may be implemented on processor 230.

It is understood that by programming and/or loading executable instructions onto the network element 200, at least one of the processor 230 and/or the memory 250 are changed, transforming the network element 200 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM, flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 3:
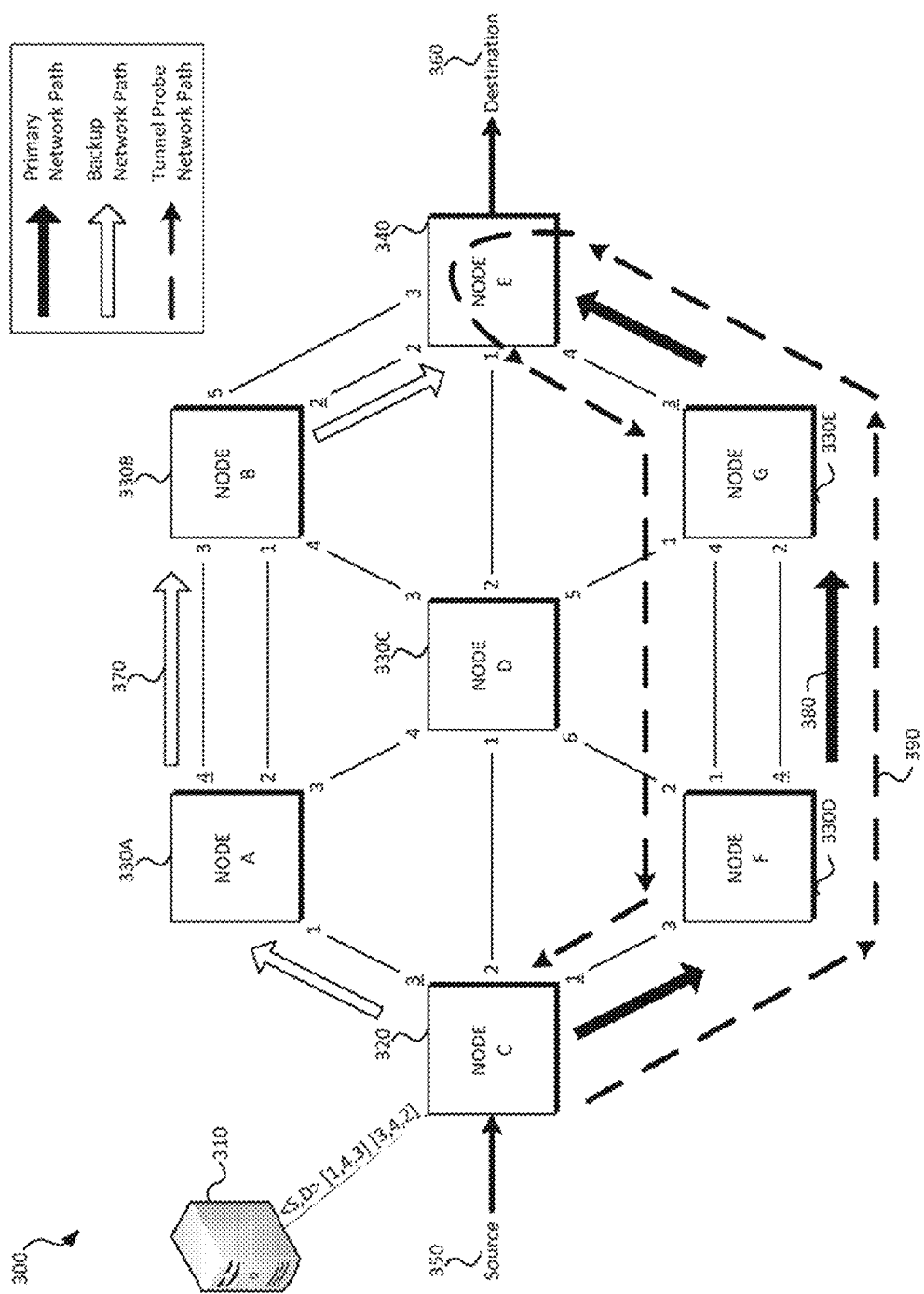
FIG. 3 is a schematic diagram of an embodiment of a protection switched source routing network.

FIG. 3 is a schematic diagram of an embodiment of a protection switched source routing network 300 that may comprise a controller 310, ingress node 320, tandem nodes 330, egress node 340, source 350, and destination 360 which may be substantially similar to controller 110, ingress node 120, tandem nodes 130, egress node 140, source 150, and destination 160, respectively, shown in FIG. 1. In network 300, a controller 310 may send connection identifiers comprising a primary network path 380, and one or more backup network paths 370, to an ingress node 320 for routing data from source 350 to destination 360 via network 300. Ingress node 320 may encapsulate connection identifiers corresponding to the primary network path 380 or connection identifiers corresponding to the backup network path 370 onto the data packet(s) received from source 350 according to a data routing and protection scheme in network 300. The protection scheme may determine a connectivity status for network paths in network 300, such as whether a network path is operating normally, operating in a degraded manner (e.g. failing to successfully transmit all data packets in a data flow and/or transmitting data at a slow or delayed rate), or not operating. A data flow may be defined as a sequence of a plurality of data packets being transmitted from a source to a destination.

Ingress node 320 may determine the connectivity status by probing network 300. To determine whether a given network path (e.g. a primary network path and/or a backup network path) is operating normally, ingress node 320 may encapsulate a probe 390 packet (e.g. a test packet) with connection identifiers corresponding to a data packet and may transmit probe 390 over the network path toward an egress node 340. In some embodiments, a timer and/or packet count may be appended to probe 390 and/or updated by ingress node 320. The timer and/or packet count may aid in ingress node 320 determining the status of network 100. To ensure probe 390 and data being transmitted over the network path share the same fate, the same set of connection identifiers may be used for both probe 390 and the data. Receiving probe 390 back from egress node 340 within a predetermined duration of time may indicate to ingress node 320 that the network path is operating normally. When the network path is operating normally, ingress node 320 may continue to encapsulate and transmit data packets and probe 390 along the network path.

When ingress node 320 does not receive probe 390 back from egress node 340, or when probe 390 is received after expiration of the predetermined period of time, ingress node 320 may determine that primary network path 380 is not operating or is operating in a degraded manner and may begin encapsulating data with connection identifiers corresponding to backup network path 370. When ingress node 320 transmits data over backup network path 370, both backup network path 370 and primary network path 380 that failed or is degraded may be probed according to the present disclosure. After a plurality of probes 390 indicate that failed or degraded primary network path 380 has returned to normal operation for a sustained period of time, ingress node 320 may return to encapsulating data packets with connection identifiers for primary network path 380 and/or probing only primary network path 380.

In addition to transmitting data packets in a manner similar to tandem nodes 130, tandem nodes 330 may transmit probes 390 from ingress node 320 toward egress node 340, and transmit probes 390 back from egress node 340 toward ingress node 320. Tandem nodes 330 may receive probe 390 from an upstream node (e.g. a network element 200). After receiving probe 390, tandem nodes 330 may examine the connection identifiers contained in the header of probe 390, extract a connection identifier that indicates a next downstream node to which probe 390 should be forwarded, and then transmit probe 390 according to the connection identifier. After probe 390 has reached egress node 340 and been reflected, tandem node 330 may receive probe 390 from a downstream node, examine the new connection identifiers contained in the header of probe 390, extract a connection identifier that indicates a next upstream node to which probe 390 should be forwarded, and then transmit probe 390 according to the connection identifier.

Egress node 340 may receive probe 390 from a tandem node 330. Upon receiving probe 390, egress node 340 may reflect (e.g. transmit back toward ingress node 320) probe 390 through network 300 via tandem nodes 330. In some embodiments, a timer and/or packet count may be appended to probe 390 and/or update by egress node 340. The timer and/or packet count may aid in ingress node 320 determining the status of network 100. In one embodiment, egress node 340 may transmit probe 390 back toward ingress node 320 by reversing the connections identified in the header of probe 390 and then transmitting probe 390 according to the connections identified. In another embodiment, egress node 340 may transmit probe 390 back toward ingress node 320 according to connections identified in the header of probe 390 that have been reversed as probe 390 traversed network 300. In yet another embodiment, egress node 340 may transmit probe 390 back toward ingress node 320 according to connection information contained in the payload of probe 390. In yet another embodiment, egress node 340 may transmit probe 390 back toward ingress node 320 according to explicitly defined instructions from controller 310. In some embodiments, egress node 340 may receive a plurality of probes 390 from primary network path 380 and backup network path 370. In these embodiments, egress node 340 may transmit a probe 390 received over primary network path 380 back toward ingress node 320 over primary network path 380, and a probe 390 received over backup network path 370 back toward ingress node 320 over backup network path 370. By employing probe 390, ingress node 320 may maintain awareness of connection/flow status over the source routing domain without requiring that tandem nodes 330 maintain a per connection state. Accordingly, tandem nodes 330 may employ few states or be completely stateless with respect to individual primary and backup connections, which may allow for smaller flow tables and support scalability for high traffic networks.

Figure 4:
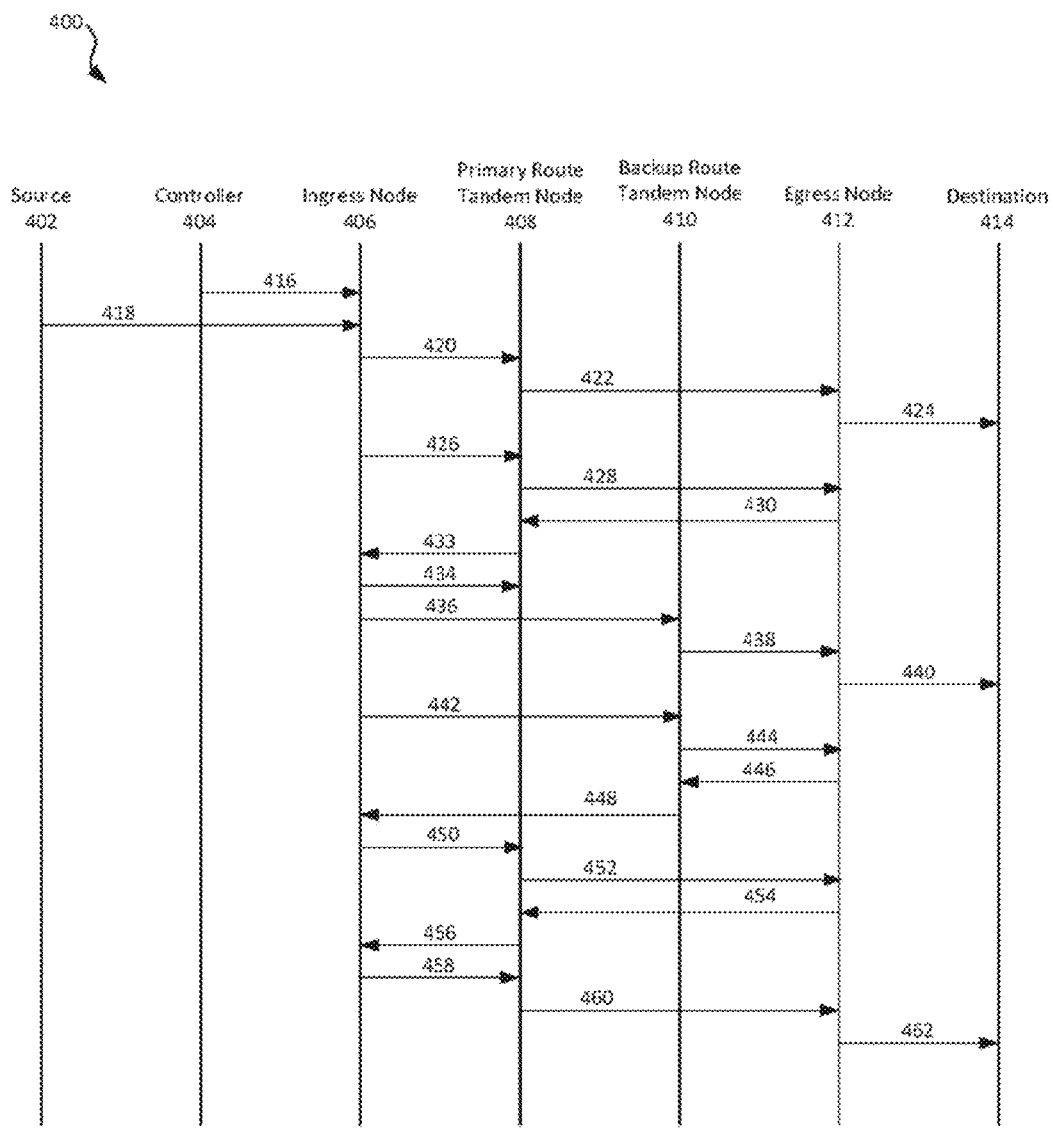
FIG. 4 is protocol diagram of an embodiment of a method for performing protection switching in a source routing network.

FIG. 4 is protocol diagram of an embodiment of a method 400 for performing protection switching in a source routing network, such as network 100 and/or network 300. The controller 404, ingress node 406, primary route tandem node 408, backup route tandem node 410, egress node 412, source 402, and destination 414 may be substantially similar to controller 310, ingress node 320, tandem node 330, egress node 340, source 350, and destination 360, respectively, shown in conjunction with network 300 in FIG. 3. At step 416, the controller may transmit a plurality of connection identifiers corresponding to a primary route through a network and a backup route through a network to the ingress node. At step 418, the source may transmit a data packet to the ingress node for forwarding through a network to the destination. The ingress node may encapsulate the primary route connection identifiers on the data packet received from the source and transmit the data packet to the primary route tandem node at step 420. At step 422, the primary route tandem node may receive the data packet from the ingress node and, according to the connection identifiers in the header of the data packet, transmit the data packet to the egress node. The egress node may receive the data packet and forward the data packet to the destination at step 424.

At step 426, the ingress node may encapsulate a network probe with the same connection identifiers used to encapsulate the data packet of steps 420, 422, and 424, and send the network probe to the primary route tandem node. At step 428, the primary route tandem node may receive the network probe from the ingress node and, according to the connection identifiers in the header of the network probe, transmit the network probe to the egress node. At step 430, the egress node may receive the network probe from the primary route tandem node and, according to any of the abovementioned embodiments, transmit the network probe back toward the ingress node via the primary route tandem node. At step 433, the primary route tandem node may transmit the network probe to the ingress node, thereby indicating the primary route through the network is operating normally.

At step 434, the ingress node may encapsulate a network probe with the same connection identifiers used to encapsulate the data packet, and send the network probe to the primary route tandem node. When a network error occurs on the primary route, the ingress node may not receive the network probe back from the egress node via the primary route tandem node before a predetermined period of time expires. In such a case, at step 436, the ingress node may encapsulate the backup route connection identifiers on a data packet received from the source and transmit the data packet to the backup route tandem node. At step 438, the backup route tandem node may receive the data packet from the ingress node and, according to the connection identifiers in the header of the data packet, transmit the data packet to the egress node. The egress node may receive the data packet and forward the data packet to the destination at step 440. Accordingly, a flow may be maintained across the source routing domain without alerting the source or the destination.

At step 442, the ingress node may encapsulate a network probe with the same connection identifiers used to encapsulate the data packet in step 436, and send the network probe to the backup route tandem node. At step 444, the backup route tandem node may receive the network probe from the ingress node and, according to the connection identifiers in the header of the data packet, transmit the data packet to the egress node. At step 446, the egress node may receive the network probe from the backup route tandem node and, according to any of the abovementioned embodiments, transmit the network probe back toward the ingress node via the backup route tandem node. At step 448, the backup route tandem node may transmit the network probe to the ingress node, thereby indicating the backup route through the network is operating normally and/or has been restored to normal operation.

At step 450, the ingress node may encapsulate a network probe with connection identifiers corresponding to the primary route through the network and send the network probe to the primary route tandem node. At step 452, the primary route tandem node may receive the network probe from the ingress node and, according to the connection identifiers in the header of the data packet, transmit the data packet to the egress node. At step 454, the egress node may receive the network probe from the primary route tandem node and, according to any of the abovementioned embodiments, transmit the network probe back toward the ingress node via the primary route tandem node. At step 456, the primary route tandem node may transmit the network probe to the ingress node, thereby indicating the primary route through the network is operating normally.

At step 458, after the primary route through the network has been determined to be operating normally over a sustained period of time (e.g. through repeating steps 450-456), the ingress node may encapsulate the primary route connection identifiers on the data packet received from the source and transmit the data packet to the primary route tandem node. At step 460, the primary route tandem node may receive the data packet from the ingress node and, according to the connection identifiers in the header of the data packet, transmit the data packet to the egress node. The egress node may receive the data packet and forward the data packet to a destination at step 462.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, e.g., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network element (NE) configured to operate in a source routing network, wherein the NE comprises:
   a receiver;
   a transmitter; and
      a processor coupled to the receiver and the transmitter and configured to cause the NE to:
      receive a liveness protection probe unicast to the NE by an upstream NE, wherein the liveness protection probe comprises a header containing a list of one or more ordered connection identifiers that indicate a network path traversing the source routing network through which the liveness protection probe should be forwarded, the liveness protection probe comprising at least one of timing and packet count information added to the liveness protection probe by an ingress node;
      replace a first connection identifier in the header with a second connection identifier, the first connection identifier uniquely identifying a link between the NE and a downstream NE, and the second connection identifier uniquely identifying a link between the NE and the upstream NE;
      transmit the liveness protection probe toward the downstream NE according to the connection identifiers;
      receive the liveness protection probe from the downstream NE after the liveness protection probe has reached an egress node and been reflected back downstream; and
      transmit the liveness protection probe to the upstream NE according to the second connection identifier after the liveness protection probe has reached the egress node and been reflected back downstream.

2. The NE of claim 1, wherein the liveness protection probe indicates a connectivity status of the network path.

3. The NE of claim 2, wherein the liveness protection probe is received and transmitted according to strict source routing headers via a stateless connection.

4. The NE of claim 1, wherein the connection identifiers each comprise an identification of a link in the source routing network, or wherein the connection identifiers each comprises an identification of a node in the source routing network.

5. The NE of claim 2, wherein the connection identifiers are assigned locally in the source routing network.

6. The NE of claim 1, wherein the processor is further configured to cause the NE to:
   receive from the upstream NE, a data packet comprising a header that comprises the connection identifiers; and
   transmit the data packet to the downstream NE according to the connection identifiers.

7. The NE of claim 4, wherein the liveness protection probe and a data packet are received and transmitted according to the same connection identifiers.

8. A method for performing protection switching in a source routing network, implemented in a network element, wherein the method comprises:
receiving via a tandem network element in the source routing network, a data packet transmitted through a network path from an ingress node;
receiving from the ingress node, via the network path of the data packet, a source routing network failure detection probe unicast from the ingress node, the failure detection probe comprising a header and a payload, and the failure detection probe comprising packet count information added to the failure detection probe by the ingress node; and
transmitting the failure detection probe toward the ingress node through the source routing network after the failure detection probe has reached an egress node and been reflected back downstream and when the failure detection probe is received from the ingress node within a predetermined duration of time, the failure detection probe being transmitted in response to receiving the failure detection probe from the ingress node, the predetermined duration of time being used to determine whether the network path is operating normally.

9. The method of claim 8, wherein the failure detection probe is transmitted to the ingress node according to indicators included in the header of the failure detection probe by reversing a route indicated in the header.

10. The method of claim 9, wherein the failure detection probe is transmitted to the ingress node according to the indicators included in the header of the failure detection probe by employing a reverse route indicated in the header.

11. The method of claim 8, wherein the failure detection probe is transmitted to the ingress node according to indicators included in the payload of the failure detection probe.

12. The method of claim 8, wherein the failure detection probe is transmitted to the ingress node according to a network path encapsulation stored at the network element.

13. The method of claim 8, wherein the failure detection probe comprises a connectivity status of the network path that indicates a liveness of the network path.

14. The method of claim 8, wherein the data packet is associated with a data flow, wherein the network path comprises a primary network path, and wherein the method further comprises:
receiving the data flow and a protection probe over a backup network path when the primary network path has failed; and
receiving the data flow and the protection probe over the primary network path when a plurality of protection probes indicate the primary network path has returned to normal operation.

15. An ingress node in a source routing network comprising:
a receiver;
a transmitter; and
a processor coupled to the receiver and the transmitter and configured to cause the ingress node to:
receive a data packet from a source;
receive a plurality of source routing encapsulation identifiers that indicate a plurality of paths across the source routing network for transmitting the data packet to an egress node; and
add at least one of timing and packet count information to a source routing network path protection probe;
unicast, to the egress node, the source routing network path protection probe along a primary network path indicated by a first set of encapsulation identifiers;
encapsulate the data packet with the first set of encapsulation identifiers when the protection probe has reached the egress node and been reflected back downstream and is received within a predetermined duration of time, the predetermined duration of time being used to determine whether the primary network path is operating normally;
encapsulate the data packet with a second set of encapsulation identifiers that indicate a backup network path over which the data packet should be forwarded when the protection probe is not received from the egress node within the predetermined duration of time, the first set of encapsulation identifiers and the second set of encapsulation identifiers being independent such that no links are shared by both the primary network path and the backup network path; and
transmit the data packet to a downstream node according to the encapsulation identifiers.

16. The ingress node of claim 15, wherein the ingress node transmits the source routing network path protection probe over both the primary network path using the first set of encapsulation identifiers and the backup network path using the second set of encapsulation identifiers when the data packet is transmitted through the backup network path according to the second set of encapsulation identifiers.

17. The ingress node of claim 16, wherein the ingress node reverts from transmitting a data flow associated with the data packet on the backup network path to transmitting the data flow on the primary network path when the source routing network path protection probe indicates the primary network path has resumed normal operation.

18. The ingress node of claim 15, wherein the ingress node further comprises a memory coupled to the processor, and wherein the memory comprises a table that comprises a plurality of network routing paths for data flows for which the ingress node serves as the ingress node to the source routing network, and wherein the table does not contain network routing paths for data flows for which the ingress node does not serve as the ingress node to the source routing network.

* * * * *